(12) United States Patent
Kim

(10) Patent No.: US 6,876,502 B2
(45) Date of Patent: Apr. 5, 2005

(54) OPTICAL SYSTEM AND OPTICAL PICKUP APPARATUS THEREWITH

(75) Inventor: Young Sik Kim, Yongin-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/242,774

(22) Filed: Sep. 13, 2002

(65) Prior Publication Data

US 2003/0048546 A1 Mar. 13, 2003

(30) Foreign Application Priority Data

Sep. 13, 2001 (KR) .................................... 2001-0056461

(51) Int. Cl.$^7$ .............................................. G02B 27/00
(52) U.S. Cl. ................ 359/719; 369/44.14; 369/112.23
(58) Field of Search ................................. 359/718, 719, 359/633, 637, 823, 824, 629, 634, 722; 369/112.22–112.26, 44.14, 44.24, 44.37

(56) References Cited

U.S. PATENT DOCUMENTS

2002/0136146 A1 * 9/2002 Lee et al. .............. 369/112.23
2002/0136147 A1 * 9/2002 Matsui ................... 369/112.24

FOREIGN PATENT DOCUMENTS

KR 1998-056227 9/1998

* cited by examiner

Primary Examiner—Georgia Epps
Assistant Examiner—Darryl J. Collins
(74) Attorney, Agent, or Firm—Birch, Stewart, Kolasch & Birch, LLP

(57) ABSTRACT

An optical pickup apparatus is capable of recording data in and/or reproducing data from recording mediums with different formats by using one single optical system. The optical pickup apparatus includes an optical system, wherein a filtering surface that transmits or reflects wavelengths from different rays coats the peripheral portion of the center portion of an input surface and the peripheral portion of the center of an output surface. A transmitting surface having a conical shape is disposed in a central portion of the input surface and projected inwardly or outwardly with respect to the input surface. Therefore, the optical pickup apparatus can be applied to different recording mediums using rays having different wavelengths and a lightweight, small optical pickup apparatus can be implemented by using one single optical system.

20 Claims, 4 Drawing Sheets

OPTICAL SYSTEM AND OPTICAL PICKUP APPARATUS THEREWITH

BACKGROUND OF THE INVENTION

1. Field of the Invention

The present invention relates to an optical pickup apparatus, and more particularly to an optical pickup apparatus for recording data on and/or reproducing data from recording mediums with different formats by using a single optical system.

2. Background of the Related Art

As a result of continuous efforts to increase a recording capacity of an optical disk, a digital video disk (hereinafter referred to as DVD) having a mass storage recording capacity in comparison to a compact disk (hereinafter referred to as CD) has been developed. Further, a high-density disk (hereinafter referred to as HD) for recording and/or reproducing data in high density (twice the density of an CD) by utilizing an existing CD and a drive therefor are currently under development. Compared with the CD, the DVD has not only a high recording density (i.e., track pitch) but also a shorter distance from the surface of the disk to the surface for recording data. Therefore, an optical pickup apparatus for a DVD has difficulty in recording or reproducing data from a CD. This is primarily because of spherical aberration (SA) which is generated when the distance between the surface of the optical disk and the surface for recording data changes, and coma aberration (CA) which is generated when the optical disk is tilted, and astigmatism due to defocusing.

Spherical aberration causes the intensity of a main lobe of an optical beam by a data recording medium area to be relatively greater than the intensity of a side lobe by an area other than the data recording medium, and as a result thereof, an interference phenomenon between data tracks is generated. Moreover, coma aberration and astigmatism make an optical system unstable, and deteriorates optic characteristics thereof. The spherical aberration, the coma aberration, and the astigmatism are dependent on the range of distances between the surface of the optical disk and the surface for recording data, refractivity, numerical aperture (NA) of an objective lens, amount of defocusing, or tilting degree of an optical disk.

Typically, an optical pickup apparatus which adjusts the diameter of an optical beam from a light source by using objective lenses with different numerical apertures, can access both the CD and the DVD.

Accordingly, two different kinds of objective lenses having different numerical apertures from each other can be used. However, an optical pickup apparatus that can access both the CD and the DVD by coating one objective lens with a SWP filter has been suggested.

FIG. 1 illustrates the structure typical of a known optical pickup apparatus for use in a combination CD/DVD mode.

Referring to FIG. 1, the optical pickup apparatus includes a light source 1 for emitting a light for use in a DVD, a light source 2 for emitting a light for use in a CD, a beam splitter 3 for transmitting an optical beam that has been emitted from the light source 1 and reflecting an optical beam that has been emitted from the light source 2, a collimating lens 4 for progressing an optical beam from the beam splitter 3 into a parallel beam, a half mirror 5 for converting a light path by reflecting the parallel beam that has passed through the collimating lens 4, an objective lens 6a for converging the beam reflected by the half mirror 5 reflected to an arbitrary spot on a disk 7, and a short wavelength pass (SWP) filter 6b for adjusting a numerical aperture NA of the objective lens 6a.

An optical beam emitted from the light source 1 for use in a DVD passes through the beam splitter 3 and becomes a parallel beam due to the collimating lens 4. On the other hand, an optical being emitted from the light source 2 for use in a CD is reflected by the beam splitter 3, and is made a parallel beam by the collimating lens 4. When the parallel beam passes through the collimating lens 4, the half mirror 5 verticalizes the optical path of the parallel beam, and the optical beam (via the half mirror 5) converges to one spot on the disk 7 via the objective lens 6a. At this time, a CD/DVD common access through selective filtering of 650 nm (DVD) and 780 nm (CD) can be made by passing the incident optical beam upon the objective lens 6a by way of the half mirror 5 through the SWP filter 6b.

When taking into consideration a compatible use of CD and DVD, consideration must be given to difference of numerical apertures (NA), difference of wavelengths, and difference of disk thicknesses (t).

This is even more so in a case of an objective lens for use in a HD for recording/reproducing, wherein a NA is 0.85, the wavelength ($\lambda$) is 405 nm, and the disk difference (t) is 0.1 mm. On the other hand, in a case of an objective lens for use in a DVD, NA is 0.6, the wavelength ($\lambda$) is 650 nm, and the disk difference (t) is 0.6 mm. Therefore, a special kind of means for overcoming the differences of NA, wavelength ($\lambda$), and t is required for the compatible use of HD and DVD. In short, the spherical aberration caused by the difference in the thicknesses of a disk and the chromatic aberration caused by the difference in laser wavelengths should be compensated in order to reproduce a disk for use in DVD.

SUMMARY OF THE INVENTION

An object of the invention is to solve at least the above problems and/or disadvantages and to provide at least the advantages described hereinafter.

Accordingly, one object of the present invention is to provide an optical pickup apparatus for recording data and/or reproducing data from recording mediums having different formats.

Another object of the present invention is to provide an optical system for converging an optical beam onto recording mediums having different formats.

The foregoing and other objects and advantages of the invention are achieved by providing an optical system for use in an optical pickup apparatus which includes: a first transmitting surface, being projected on a center of an input surface, for transmitting a first ray and a second ray; a first filtering surface, being coated around the first transmitting surface, for transmitting the first ray and simultaneously transmitting the second ray; a second transmitting surface, being projected on an output surface that is opposite to the first transmitting surface and to the first filtering surface, for converging the first ray and the second ray that are incident upon the first transmitting surface; and a second filtering surface, being coated around the second transmitting surface, for reflecting the first ray and simultaneously transmitting the second ray.

Preferably, the wavelength of the second ray is longer than the wavelength of the first ray.

Preferably, the first transmitting surface is projected inwardly or outwardly.

Preferably, the first ray and the second ray are selected from rays for use in a CD, rays for use in a DVD, or rays for use in a HD.

According to another aspect of the invention, an optical system for use in an optical pickup apparatus includes: a first transmitting surface, being projected on a center of an input surface, for transmitting a first wavelength and a second wavelength; a second transmitting surface, being formed at a center of an output surface that is opposite to the first transmitting surface, for converging the first wavelength and the second wavelength; and a first and second filtering surface, being coated around the first and second transmitting surfaces, respectively, for reflecting the first wavelength and for simultaneously transmitting the second wavelength.

Preferably, the first and second filtering surfaces are made of a material that is capable of selectively transmitting rays, depending on a wavelength.

Preferably, the first wavelength and the second wavelength is for use in a CD, a DVD, or a HD.

According to still another aspect of the present invention, an optical pickup apparatus includes: a first and second light source for emitting first and second rays, respectively; a beam splitter for transmitting the first rays emitted from the first light source and reflecting the second rays emitted from the second light source; a half mirror for converting a light path by reflecting the first and second rays in progress from the beam splitter; and an optical system, which is coated with a first and second filtering surface being projected on a center of an input surface for selectively transmitting rays toward a center of an external area of the input surface and a center of an output surface according to wavelength, for converging the first rays and the second rays reflected by the half mirror to different recording mediums with different formats, respectively.

Preferably, the second rays have a longer wavelength than the first rays.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a preferred embodiment of the invention in reference to the accompanying drawings.

Figure 1:
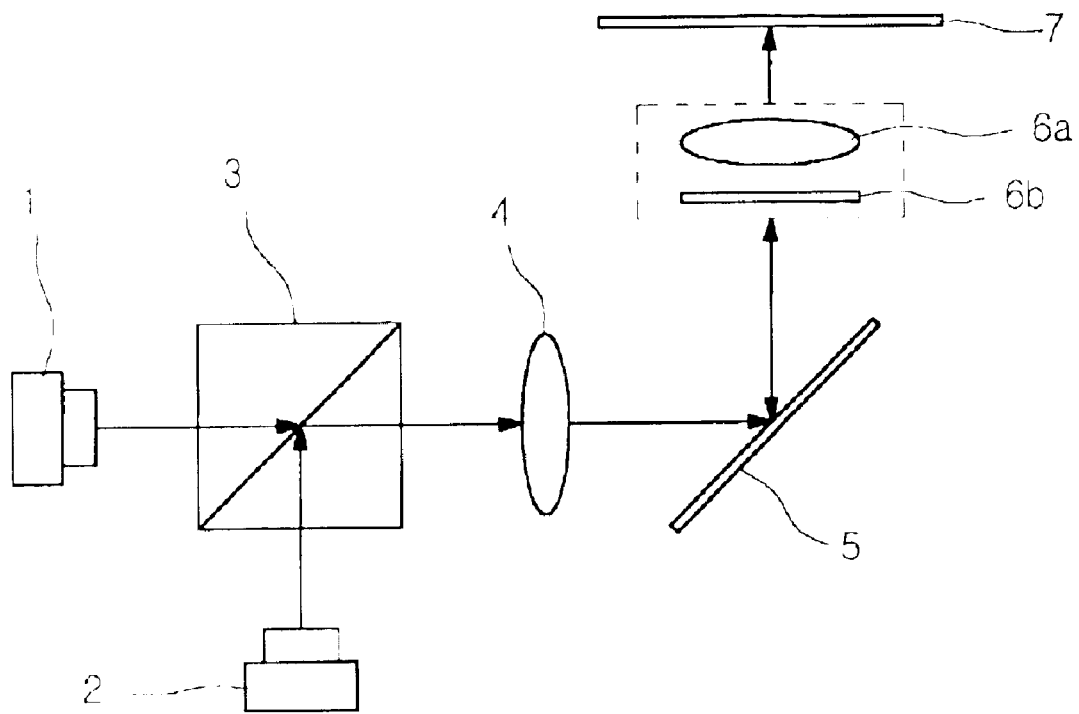
FIG. 1 is a schematic diagram of a typical known optical pickup apparatus for use in a combination CD/DVD.
Figure 2:
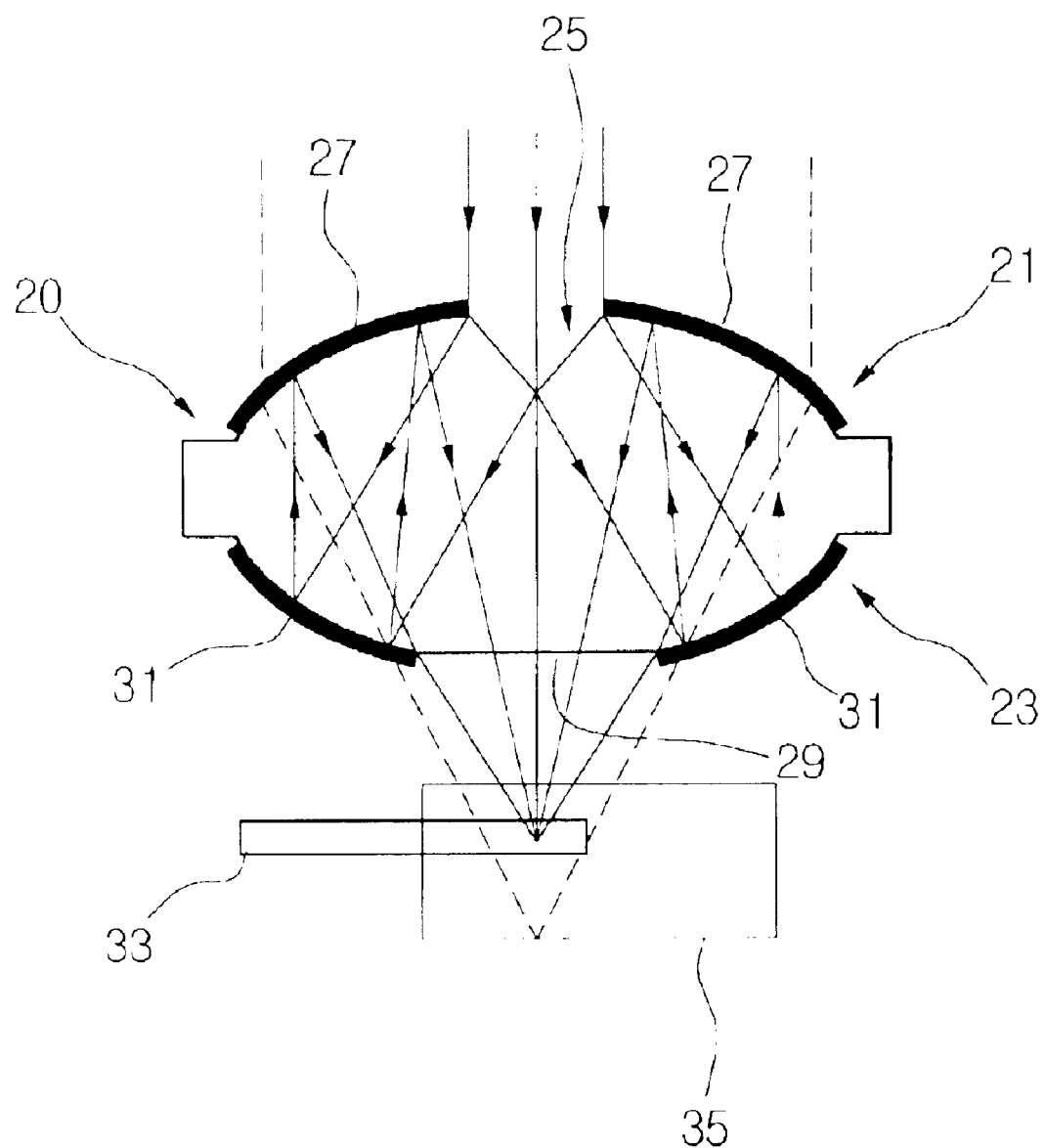
FIG. 2 illustrates an optical system in accordance with a preferred embodiment of the present invention.

FIG. 2 is an optical system in accordance with a preferred embodiment of the present invention. Particularly, the optical system illustrated in FIG. 2 is a catadioptric lens that is capable of selectively transmitting light, depending on wavelengths of different rays. In FIG. 2, solid lines represent the light progress direction of a HD, and dotted lines represent the light progress direction of a DVD.

Referring to FIG. 2, the optical system 20 includes a first transmitting surface 25 being formed on a center of an input surface 21, a first filtering surface 27 being formed around the first transmitting surface 25, a second transmitting surface 29 being formed on an opposite side of the input surface 21, namely a center of an output surface 23 in opposite to the input surface 21, and a second filtering surface 31 being formed around the second transmitting surface 29.

The first transmitting surface 25 is projected toward the inside of the optical system 21, forming a conical shape. That is, the first transmitting surface 25, when it is seen from the side of the optical system 20, gets narrower on the top looking down, and part of the side is tilted at certain angles. Here, the tilting degree should be designed in such manner that when an incident rays are emitted through the first transmitting surface 25, the rays should be incident upon the second filtering surface 31. Also, a slope surface of the transmitting surface with the conical shape has a round shape projected inwardly or outwardly. If an arbitrary rays (rays for use in DVD or rays for use in HD) are incident upon the first transmitting surface 25, the arbitrary rays are refracted to inward of the optical system 20, due to the tilted transmitting surface 25, and is emitted later.

The first filtering surface 27 and the second filtering surface 31 are made of a material for transmitting rays selectively, depending on their wavelengths. In other words, the first filtering surface 27 and the second filtering surface 31 transmit rays with long wavelengths, while reflecting rays with short wavelengths. For example, when rays for use in a DVD having a wavelength of 650 nm and rays for use in HD having a wavelength of 405 nm are incident upon the first and second filtering surface 27, 31, the rays for use in a DVD having a long wavelength are transmitted, but the rays for use in a HD having a short wavelength are all reflected. Here, the first and second filtering surface 27, 31 should be able to selectively transmit all rays incident upon its inner surface and outer surface.

Preferably, every part of the first and second filtering surface 27, 31 except for the first and second transmitting surface 25, 29, is coated to be able to encompass the diameter of rays having a long wavelength (e.g., rays for use in DVD).

The second transmitting surface 29 could be perfectly flat or a slight bent plane. Also, the second transmitting surface 29 is desirable to have a diameter that is larger than the diameter of the first transmitting surface 25 at the least.

In the operation of the optical system with the above-described structure, the rays for use in HD are incident upon the first transmitting surface 25, and are refracted due to the tilted surface and is later incident upon the second filtering surface 31. The rays for use in HD incident on the second filtering surface 31 are reflected and incident upon the first filtering surface 27. Afterward, the rays for use in HD are reflected by the first filtering surface 27, and are incident upon the second transmitting surface 29, and is finally converged on the disk 33.

In the meantime, the rays for use in DVD having a broader width than the rays for use in HD are incident upon the first transmitting surface 25 and the first filtering surface 27. Similar to the rays for use in HD, the rays for use in DVD are emitted at the first transmitting surface 25, and the first filtering surface 27 transmits the rays for use in DVD without any change. The rays for use in DVD, because of the curved input surface 21 of the optical system 20, are refracted at certain angles. Once the rays for use in DVD pass through the first filtering surface 27, they are incident upon the second transmitting surface 29, and converged on the DVD use disk 35.

In general, the optical system according to the preferred embodiment of the present invention is applied to an optical pickup apparatus, enabling to record/reproduce data of recording mediums with different formats. More details involved in this part are now provided with reference to FIG. 3.

Figure 3:
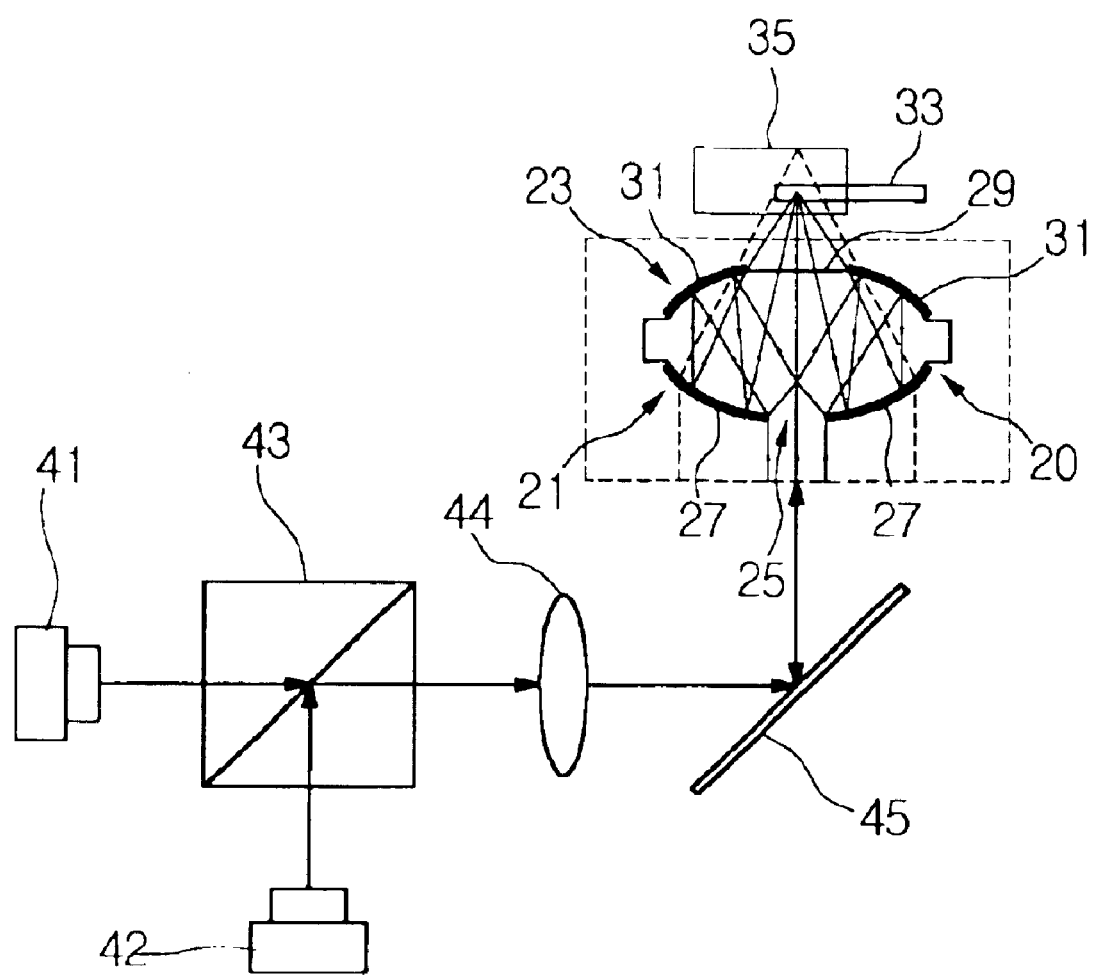
FIG. 3 is an optical pickup apparatus mounted with the optical system illustrated in FIG. 2, for use in a combination HD/DVD.

FIG. 3 is an optical pickup apparatus mounted with the optical system illustrated in FIG. 2, for use in a combination HD/DVD. Referring to FIG. 3, the optical pickup apparatus includes a HD use light source 41 for emitting light for use in a HD, a light source 42 for use in a DVD for emitting light for use in DVD, a beam splitter 43 for transmitting the optical beam that is emitted from the HD use light source 41 and reflecting the optical beam that is emitted from the light source 42 for use in DVD, a collimating lens 44 for making an optical beam in progress from the beam splitter 43 to a parallel beam, a half mirror 45 for reflecting the parallel beam that has passed through the collimating lens 44 and converting the light path thereof, and an optical system 20 for selectively transmitting or reflecting the rays for use in a HD and the rays for use in a DVD that are reflected from the half mirror 45, depending on a wavelength of the rays, thereby converging each ray to recording mediums having different formats, respectively.

As aforementioned in the description on FIG. 2, the optical system 20 includes the first transmitting surface 25 formed on the input surface 21 in the direction of an optical axis, and the second transmitting surface 29 formed on the output surface 23. Further, the optical system 20 includes the first filtering surface 27 and the second filtering surface 31 that are coated with material for selectively transmitting or reflecting rays to the peripheral sides of the first and second transmitting surface 25, 29. As described before, when rays for use in a HD (wavelength: 405 nm) and rays for use in a DVD (wavelength: 650 nm) are incident upon the optical system 20, the rays for use in a HD are emitted at the first transmitting surface 25, and reflected by the second filtering surface 31 and the first filtering surface 27 in succession, and finally converged to the HD use disk 33 through the second transmitting surface 29. On the other hand, the rays for use in DVD are transmitted through the first and second filtering surfaces 27, 31, and converged to the DVD use disk 35.

In addition, the shape of the first transmitting surface 25 shown in FIG. 2 can be changed to achieve the objects of the present invention.

Figure 4:
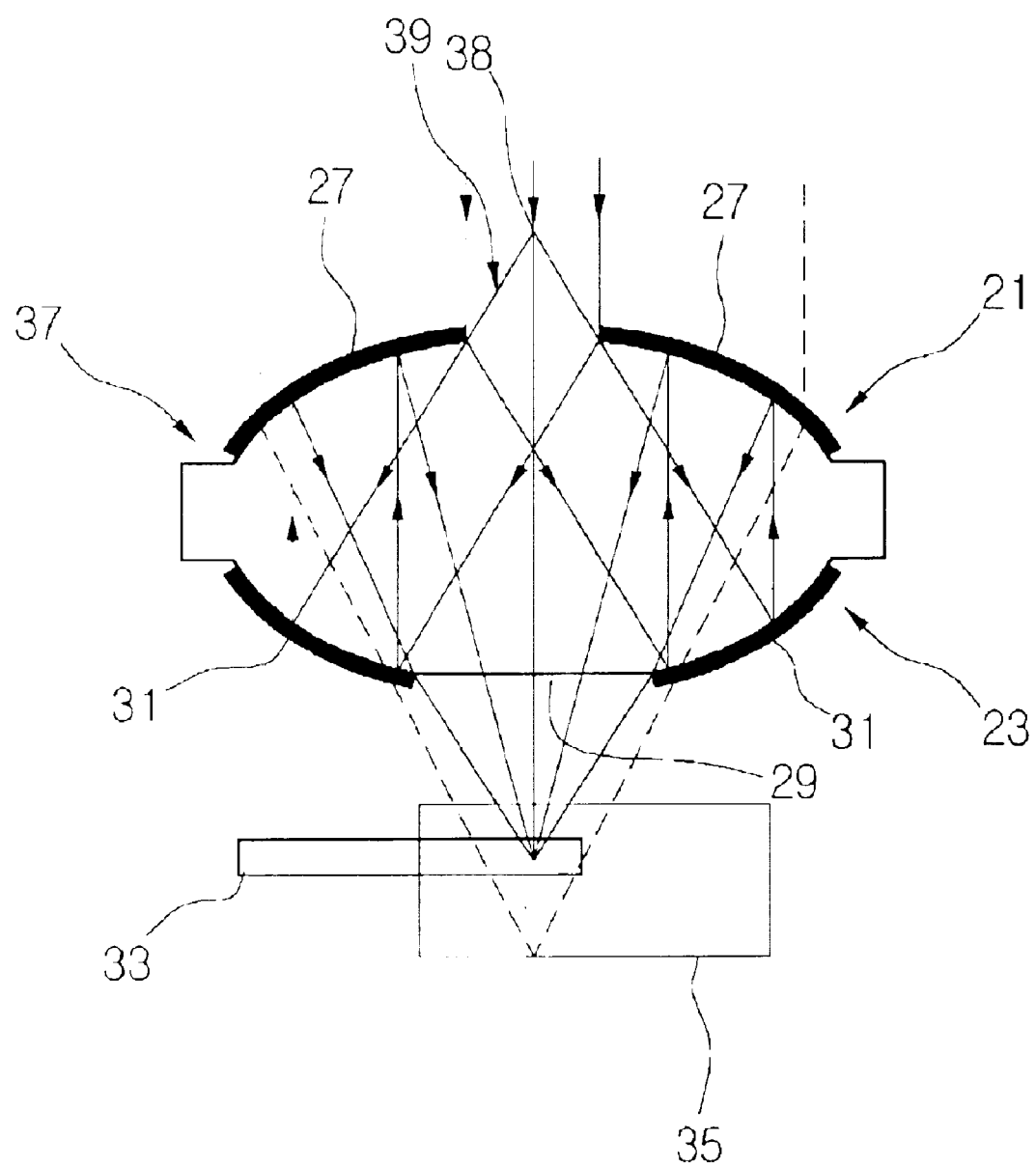
FIG. 4 depicts an optical system in accordance with another preferred embodiment of the present invention.

FIG. 4 depicts an optical system in accordance with another preferred embodiment of the present invention. As shown in the optical system 37, because the second transmitting surface 29 and the first and second filtering surface 27, 31 are the identical with those in FIG. 2 in terms of shape and function, the same reference numerals are used here again, but a first transmitting surface 39 is different from the first transmitting surface of FIG. 2.

More specifically, the first transmitting surface 39 in the optical system according to another preferred embodiment of the present invention is projected outwardly, having the conical shape. This might be understood better with reference to FIG. 2. In short, the first transmitting surface 25 in FIG. 2 has a conical shape, being projected inwardly, but the first transmitting surface 39 in FIG. 4 has a conical shape, being projected outwardly.

Accordingly, the rays for use in HD having the wavelength of 405 nm, being incident upon the first transmitting surface 39, progress in an opposite direction of the rays for use in HD of FIG. 2. To summarize, the rays for use in HD illustrated in FIG. 2 are emitted from the first transmitting surface 25, but the rays for use in HD illustrated in FIG. 4 are shrunk at the first transmitting surface 39. For instance, the rays for use in HD being incident upon the left side centering on the vertex of the conical shaped first transmitting surface 39 in FIG. 4 are refracted and progresses to the right side, while the rays for use in HD being incident upon the right side are refracted and progressed to the left side.

The rays for use in a HD ate then reflected by the first and second filtering surface 27, 31, and converged to the HD use disk 33 through the second transmitting surface 29.

While the invention has been shown and described with reference to certain preferred embodiments thereof, it will be understood by those skilled in the art that various changes in form and details may be made therein without departing from the spirit and scope of the invention as defined by the appended claims. For example, while the invention has been described in connection with the HD and the DVD, those skilled in the art will appreciate that the optical pickup apparatus embodying the principles of the present invention can be applied to the CD or different kinds of recording mediums.

In addition, the first transmitting surface can be formed having a round shape and having a curvature.

Therefore, using one single optical system, it is possible to record data on and/or reproduce data from recording mediums having different formats, respectively, thereby expanding the applicability of the optical pickup apparatus.

Further, unlike the conventional optical pickup apparatus having a relatively large thickness because of the optical system mounted with a SWP filter for filtering wavelengths, besides having the objective lens for recording data in different recording mediums, the present invention introduces a thin, lightweight optical pickup apparatus in which one single optical system having a different structure is used.

The foregoing embodiments and advantages are merely exemplary and are not to be construed as limiting the present invention. The present teaching can be readily applied to other types of apparatuses. The description of the present invention is intended to be illustrative, and no to limit the scope of the claims. Many alternatives, modifications, and variations will be apparent to those skilled in the art.

What is claimed is:

1. An optical system for use in an optical pickup apparatus for converging a first ray and a second ray, wherein the first ray has a shorter wavelength than the second ray, comprising:

a first transmitting surface, disposed in a center portion of an input surface, for transmitting the first ray and the second ray;

a first filtering surface, coated around the first transmitting surface, for transmitting the first ray and simultaneously transmitting the second ray;

a second transmitting surface, disposed in a central portion of an output surface that is opposite to the first transmitting surface and to the first filtering surface, for converging the first ray and the second ray that are incident upon the first transmitting surface; and a second filtering surface, coated around the second transmitting surface, for reflecting the first ray and simultaneously transmitting the second ray.

2. The optical system according to claim 1, wherein the first transmitting surface emits the first ray to the second filtering surface.

3. The optical system according to claim 1, wherein the second filtering surface reflects the first ray, which has been emitted through the first transmitting surface, onto the first filtering surface.

4. The optical system according to claim 1, wherein the first filtering surface reflects the first ray, which has been reflected from the second filtering surface, onto the second transmitting surface.

5. The optical system according to claim 1, wherein the first transmitting surface is projected inwardly or outwardly with respect to the first filtering surface.

6. The optical system according to claim 1, wherein the first transmitting surface has a conical shape or round shape with a curvature.

7. The optical system according to claim 6, wherein a slope surface of the transmitting surface with the conical shape has a round shape projected inwardly or outwardly with respect to the first filtering surface.

8. The optical system according to claim 1, wherein the coated first filtering surface is is wide enough to encompass a diameter of the second ray.

9. The optical system according to claim 1, wherein the first ray and the second ray is selected from a group consisting of rays for use in a CD, rays for use in a DVD, and rays for use in a HD.

10. An optical system for use in an optical pickup apparatus for converging a first wavelength and a second wavelength, comprising:
   a first transmitting surface, disposed on a center portion of an input surface, for transmitting the first wavelength and the second wavelength;
   a second transmitting surface, disposed at a center portion of an output surface that is opposite to the first transmitting surface, for converging the first wavelength and the second wavelength; and
   a first filtering surface and a second filtering surface, being coated around the first and second transmitting surfaces respectively, for reflecting the first wavelength and for simultaneously transmitting the second wavelength.

11. The optical system according to claim 10, wherein the second filtering surface reflects the first wavelength, which has been emitted through the first transmitting surface, onto the first filtering surface.

12. The optical system according to claim 10, wherein the first filtering surface reflects the first wavelength, which has been reflected from the second filtering surface, onto the second transmitting surface.

13. The optical system according to claim 10, wherein the first and second filtering surface are made of a material that is capable of selectively transmitting rays in accordance with a wavelength thereof.

14. The optical system according to claim 10, wherein the first transmitting surface is projected inwardly or outwardly with respect to the first filtering surface.

15. The optical system according to claim 10, wherein the first wavelength and the second wavelength are selected from a group consisting of wavelengths for use in a CD, wavelengths for use in a DVD, and wavelengths for use in a HD.

16. An optical pickup apparatus for recording/reproducing data, interchangeably using recording mediums with different formats, comprising:
   a first and second light source for emitting a first and second rays, respectively;
   a beam splitter for transmitting the first ray that are emitted from the first light source and reflecting the second rays that are emitted from the second light source;
   a half mirror for converting a light path by reflecting the first and second rays in progress from the beam splitter; and
   an optical system, having coated first and second filtering surfaces disposed around a projected center portion of an input surface for selectively transmitting rays toward a center of an external area of the input surface and of an output surface according to wavelength, for converging the first rays and the second rays reflected by the half mirror to different recording mediums with different formats, respectively.

17. The optical pickup apparatus according to claim 16, wherein the second rays have a longer wavelength than the first rays.

18. The optical pickup apparatus according to claim 16, wherein the first rays are incident upon the center of the input surface, and reflected by the first and second filtering surface, and converged to one of the different recording mediums.

19. The optical pickup apparatus according to claim 16, wherein the second rays are incident upon the entire input surface, and transmitted through the first filtering surface inside of which the first rays are refracted, and converged onto one of the different recording mediums.

20. The optical pickup apparatus according to claim 16, wherein the center of the input surface is projected inwardly or outwardly with respect to the first and second filtering surfaces.

* * * * *